United States Patent
Satou et al.

(10) Patent No.: US 10,746,853 B2
(45) Date of Patent: Aug. 18, 2020

(54) ON-BOARD RADAR APPARATUS AND NOTIFICATION SYSTEM

(71) Applicant: DENSO CORPORATION, Kariya, Aichi-pref. (JP)

(72) Inventors: Miki Satou, Kariya (JP); Yasuyuki Miyake, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 658 days.

(21) Appl. No.: 15/325,884

(22) PCT Filed: Jul. 13, 2015

(86) PCT No.: PCT/JP2015/070068
§ 371 (c)(1),
(2) Date: Jan. 12, 2017

(87) PCT Pub. No.: WO2016/009999
PCT Pub. Date: Jan. 21, 2016

(65) Prior Publication Data
US 2017/0176585 A1    Jun. 22, 2017

(30) Foreign Application Priority Data

Jul. 16, 2014 (JP) .................................. 2014-145980

(51) Int. Cl.
*G01S 7/41* (2006.01)
*G01S 13/58* (2006.01)
(Continued)

(52) U.S. Cl.
CPC ............ *G01S 7/415* (2013.01); *G01S 13/536* (2013.01); *G01S 13/583* (2013.01);
(Continued)

(58) Field of Classification Search
CPC ........ G01S 13/583; G01S 7/415; G01S 13/56; G01S 13/931; G01S 13/536;
(Continued)

(56) References Cited

U.S. PATENT DOCUMENTS 8,390,509 B2 * 3/2013 Asanuma ............... G01S 13/931
342/147
9,604,572 B2 * 3/2017 Kohler .................. G01S 13/931
(Continued)

FOREIGN PATENT DOCUMENTS

JP    2002-323559 A    11/2002
JP    2010-038706 A    2/2010
(Continued)

*Primary Examiner* — Matthew M Barker
(74) *Attorney, Agent, or Firm* — Maschoff Brennan (57) ABSTRACT

A radar apparatus generates a strength distribution indicating a correspondence relationship between a relative speed parameter related to an observation point relative speed and a reflection strength parameter related to reflection strength of radar waves reflected at an observation point, for a plurality of observation points. Furthermore, the radar apparatus determines that a traveling vehicle is detected when the reflection strength parameter decreases as the relative speed parameter increases from a center relative speed parameter that is the relative speed parameter corresponding to a peak in the reflection strength, the reflection strength parameter decreases as the relative speed parameter decreases from the center relative speed parameter, and a distribution of the reflection strength parameter is symmetrical with the center relative speed parameter at the center.

8 Claims, 6 Drawing Sheets

(51) Int. Cl.
  *G01S 13/931*    (2020.01)
  *G01S 13/536*    (2006.01)
(52) U.S. Cl.
  CPC ....... *G01S 13/931* (2013.01); *G01S 2013/932* (2020.01); *G01S 2013/93272* (2020.01); *G01S 2013/93274* (2020.01)
(58) Field of Classification Search
  CPC ..... G01S 2013/9353; G01S 2013/9385; G01S 2013/9378; G01S 2013/93274; G01S 2013/93272; G01S 2013/932; G08G 1/166; G08G 1/165; G08G 1/052
  See application file for complete search history.

(56) References Cited

U.S. PATENT DOCUMENTS

| | | |
|---|---|---|
| 2009/0102698 A1 | 4/2009 | Ichiyanagi et al. |
| 2010/0097200 A1* | 4/2010 | Hilsebecher ............ G01S 7/412 340/436 |

FOREIGN PATENT DOCUMENTS

| | | |
|---|---|---|
| JP | 2010-043960 A | 2/2010 |
| JP | 2011-47694 A | 3/2011 |
| JP | 2013-257249 A | 12/2013 |

* cited by examiner

ON-BOARD RADAR APPARATUS AND NOTIFICATION SYSTEM

CROSS-REFERENCE TO RELATED APPLICATION

This application is a U.S. National Phase Application under 35 U.S.C. 371 of International Application No. PCT/JP2015/070068 filed on Jul. 13, 2015 and published in Japanese as WO 2016/009999 A1 on Jan. 21, 2016. This application is based on and claims the benefit of priority from Japanese Patent Application No. 2014-145980, filed Jul. 16, 2014. The entire disclosures of all of the above applications are incorporated herein by reference.

TECHNICAL FIELD

The present invention relates to an on-board radar apparatus that detects an object present in the vicinity of a vehicle and a notification system.

BACKGROUND ART

Conventionally, an on-board radar apparatus that detects an object in the vicinity of a vehicle by irradiating radar waves as transmission waves over a predetermined angle in the vicinity of the vehicle and receiving reflected waves is known (for example, refer to PTL 1).

CITATION LIST

Patent Literature

[PTL 1] JP-A-2010-43960

SUMMARY OF INVENTION

Technical Problem

The radar apparatus detects a speed component in a direction towards an antenna surface. Therefore, when an object positioned directly next to an own vehicle is detected, the on-board radar apparatus determines that a relative speed of the object is zero. That is, a problem occurs in that the on-board radar apparatus is unable to determine whether the object positioned directly next to the own vehicle is stationary or is a vehicle that is traveling alongside the own vehicle at the same traveling speed.

The present invention has been achieved in light of such issues. An object of the present invention is to provide a technology that enables determination regarding whether or not a detected object is traveling to be made even in cases in which a relative speed in relation to the detected object is zero.

Solution to Problem

An on-board radar apparatus of the present invention is attached to a vehicle such that a direction at 90° relative to a front-rear direction of the vehicle is included in a detection range, and transmits and receives radar waves, thereby detecting an observation point relative speed that is a relative speed in relation to an observation point that is present within the detection range and has reflected the radar waves. In addition, the on-board radar apparatus of the present invention includes a strength distribution generating means and a traveling vehicle detecting means.

The strength distribution generating means generates a strength distribution indicating a correspondence relationship between a relative speed parameter related to a relative speed of an observation point and a reflection strength parameter related to reflection strength of the radar waves reflected at the observation point, for a plurality of observation points.

The traveling vehicle detecting means determines that a traveling vehicle is detected when, in the strength distribution, all of a first detection condition, a second detection condition, and a third detection condition are met. The first detection condition is that the reflection strength parameter decreases as the relative speed parameter increases from a center relative speed parameter that is the relative speed parameter corresponding to a peak in the reflection strength. The second detection condition is that the reflection strength parameter decreases as the relative speed parameter decreases from the center relative speed parameter. The third detection condition is that a distribution of the reflection strength parameter is symmetrical with the center relative speed parameter at the center.

As a result of the on-board radar apparatus configured in this way, a wheel that is rotating is detected based on the first detection condition, the second detection condition, and the third detection condition. That is, the above-described strength distribution of the radar waves reflected by a wheel that is rotating meets all of the first detection condition, the second detection condition, and the third detection condition. In addition, the on-board radar apparatus of the present invention determines that a traveling vehicle is detected by determining that an object including a wheel that is rotating is a vehicle that is traveling.

In this way, as a result of the on-board radar apparatus of the present invention, a rotating wheel can be detected based on the above-described strength distribution. Therefore, whether or not a detected object is traveling can be determined even when a relative speed in relation to the detected object is zero.

DESCRIPTION OF EMBODIMENTS

An embodiment of the present invention will hereinafter be described with reference to the drawings.

Figure 1:
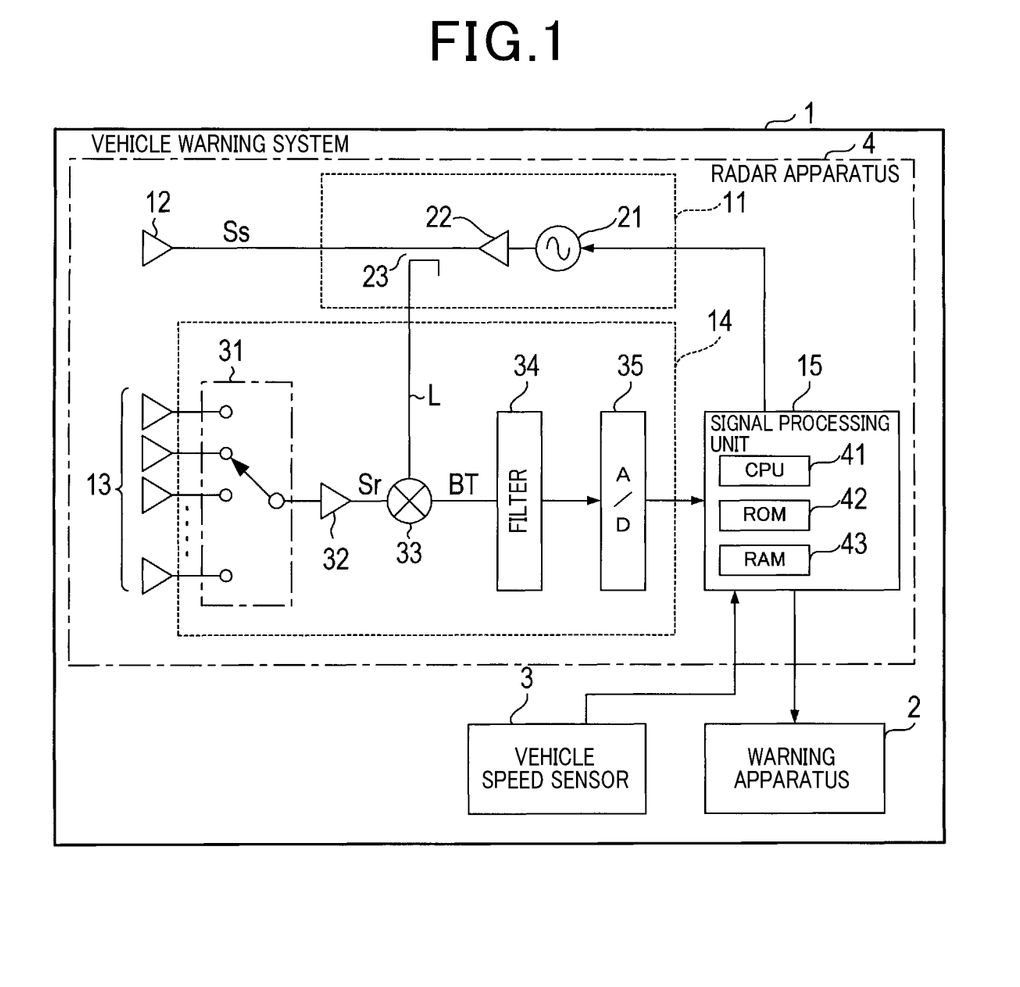
FIG. 1 is a block diagram of a configuration of a vehicle warning system according to an embodiment.

A vehicle warning system 1 according to the present embodiment is mounted in a vehicle. As shown in FIG. 1, the vehicle warning system 1 includes a warning apparatus 2, a vehicle speed sensor 3, and a radar apparatus 4.

The warning apparatus 2 is an audio output apparatus that is set inside a vehicle cabin. The warning apparatus 2 issues a warning to an occupant of the vehicle.

The vehicle speed sensor 3 detects a traveling speed of the vehicle (referred to, hereafter, as an own vehicle) in which the vehicle warning system 1 is mounted.

The radar apparatus 4 uses a known dual-frequency continuous-wave (CW) method. The radar apparatus 4 includes a transmission circuit 11, a transmission antenna 12, a reception antenna 13, a reception circuit 14, and a signal processing unit 15.

The transmission circuit 11 supplies a transmission signal Ss to the transmission antenna 12. The transmission circuit 11 includes an oscillator 21, an amplifier 22, and a distributor 23. The oscillator 21 generates a millimeter-waveband high-frequency signal. The oscillator 21 generates a high-frequency signal having a first frequency f1 and a high-frequency signal having a second frequency f2 in an alternating manner at a short time interval, and outputs the generated high-frequency signals. The second frequency f2 is a slightly different frequency than the first frequency f1. The amplifier 22 amplifies the high-frequency signal outputted from the oscillator 21. The distributor 23 performs power distribution of the output signal of the amplifier 22 to the transmission signal Ss and a local signal L.

The transmission antenna 12 irradiates a radar wave based on the transmission signal Ss supplied from the transmission circuit 11. The radar wave has a frequency that corresponds to the transmission signal Ss. As a result, a radar wave having the first frequency f1 and a radar wave having the second frequency f2 are alternately outputted.

The reception antenna 3 is an array antenna configured such that a plurality of antenna elements are arrayed in a single row.

The reception circuit 14 includes a reception switch 31, an amplifier 32, a mixer 33, a filter 34, and an analog-to-digital (A/D) converter 35. The reception switch 31 successively selects any one of the plurality of antenna elements configuring the reception antenna 13 and outputs a reception signal Sr from the selected antenna element to the amplifier 32. The amplifier 22 amplifies the reception signal Sr inputted from the reception switch 31 and outputs the amplified reception signal Sr to the mixer 33. The mixer 33 mixes the reception signal Sr amplified by the amplifier 32 and the local signal L, and generates a beat signal BT. The filter 34 removes unnecessary signal components from the beat signal BT generated by the mixer 33. The A/D converter 35 samples the beat signal BT outputted from the filter 34 and converts the beat signal BT to digital data. The A/D converter 35 then outputs the digital data to the signal processing unit 15.

The signal processing unit 15 is an electronic control unit that is mainly configured by a known microcomputer including a central processing unit (CPU) 41, a read-only memory (ROM) 42, a random access memory (RAM) 43, and the like. The signal processing unit 15 performs signal analysis and controls operation of the radar apparatus 4 as a result of the CPU 41 performing processes based on programs stored in the ROM 42.

Specifically, the signal processing unit 15 controls the transmission circuit 11 so that the radar waves having the first frequency f1 and the radar waves having the second frequency f2 are alternately emitted from the transmission antenna 12 at a modulation cycle Tm. In addition, the signal processing unit 15 enables the beat signal BT of each of the plurality of antenna elements configuring the reception antenna 13 to be sampled in the reception circuit 14. The signal processing unit 15 then measures a distance (referred to, hereafter, as an observation point distance) to a point (referred to, hereafter, as an observation point) at which the radar wave is reflected, a relative speed (referred to, hereafter, as an observation point relative speed) in relation to the observation point, and an orientation (referred to, hereafter, as an observation point orientation) at which the observation point is present, by analyzing the sampling data of the beat signals BT.

In the dual-frequency CW method, a first beat signal and a second beat signal are generated as the beat signal BT. The first beat signal is generated by the reception signal Sr having the first frequency f1 and the local signal L having the first frequency f1 being mixed. In a similar manner, the second beat signal is generated by the reception signal Sr having the second frequency f2 and the local signal L having the second frequency f2 being mixed.

Relationships in following expressions (1) and (2) are established between a frequency fb1 of the first beat signal and a frequency fb2 of the second beat signal, and an observation point relative speed v. In expressions (1) and (2), c is the speed of light.

$$fb1 = (2v/c) \times f1 \quad (1)$$

$$fb2 = (2v/c) \times f2 \quad (2)$$

That is, in the dual-frequency CW method, the observation point relative speed is measured based on the frequency of the generated beat signal.

Furthermore, in the dual-frequency CW method, as is known, the observation point distance is calculated based on a phase difference between the first beat signal and the second beat signal.

Figure 2:
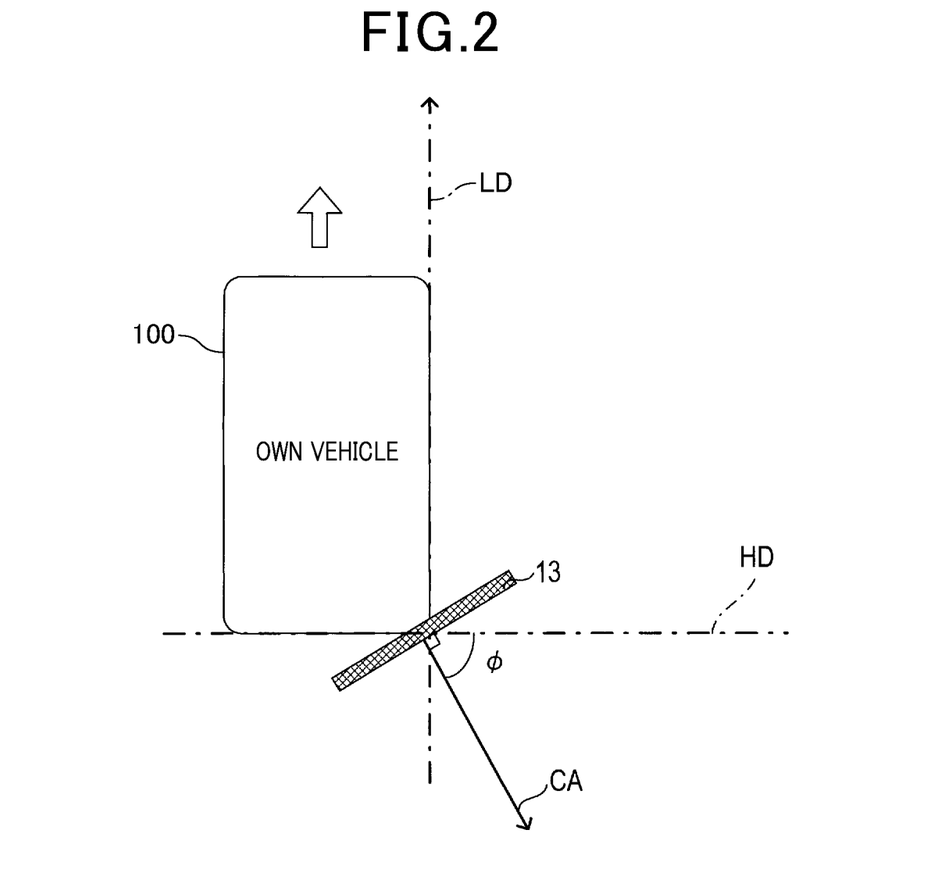
FIG. 2 is an explanatory diagram of an attachment position of a reception antenna shown in FIG. 1.

The reception antenna 13 is provided on each of the left and right ends at the rear of the own vehicle. As shown in FIG. 2, the reception antenna 13 is attached such that a center axis CA of a detection range of the reception antenna 13 faces a direction at an angle in relation to a left-right direction HD of an own vehicle 100 by an attachment angle φ towards the rear (towards the left side regarding the reception antenna 13 positioned on the left side, and towards the right side regarding the reception antenna 13 positioned on the right side). In addition, the detection range is set so as to include a direction at 90° relative to a front-rear direction LD of the own vehicle 100. In the present example, a reception antenna 13 that covers a range of about ±90° with the center axis CA at the center is used.

In the vehicle warning system 1 configured in this way, the signal processing unit 15 performs a traveling vehicle detection process for detecting a vehicle that is traveling near the own vehicle 100. The traveling vehicle detection process is a process that is performed at every modulation cycle Tm while the signal processing unit 15 is in operation.

Figure 3:
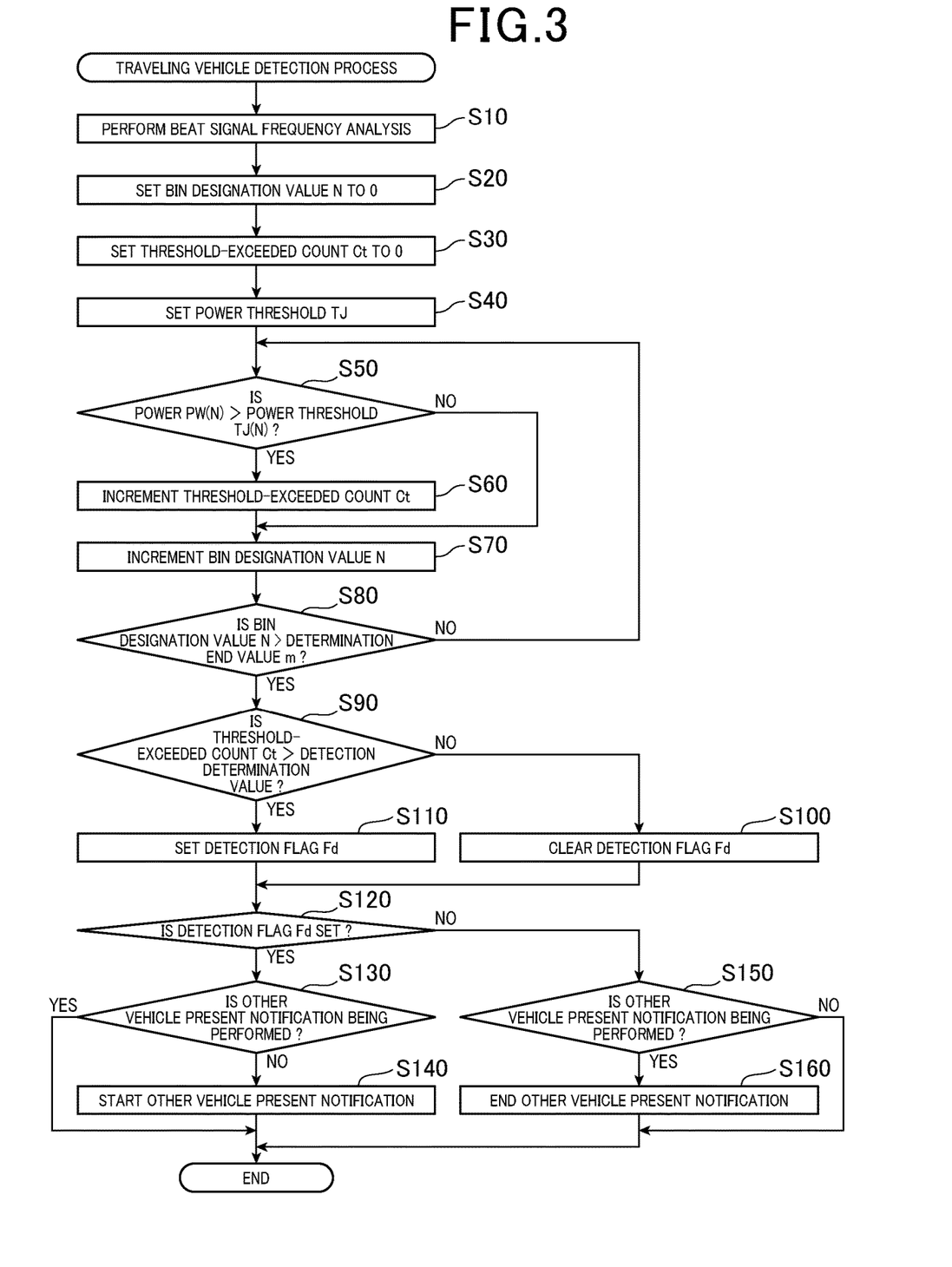
FIG. 3 is a flowchart of a traveling vehicle detection process by a signal processing unit shown in FIG. 1.

When the traveling vehicle detection process is performed, as shown in FIG. 3, first, at step S10, the signal processing unit 15 performs frequency analysis (fast Fourier transform (FFT) according to the present embodiment) of the beat signal inputted from the reception circuit 14 and determines a power spectrum of the beat signal BT. The power spectrum indicates the frequencies of the beat signal and the strength (power according to the present embodiment) of the beat signal at each frequency.

The beat signal is a real signal. Therefore, when Fourier transform is performed on the beat signal, the frequency spectrum of the beat signal has positive frequency components and negative frequency components of which the absolute values of the frequencies are equal to each other.

At step S10, the signal processing unit 15 detects the phase of the beat signal by performing an in-phase and quadrature (IQ) detection on the beat signal. Based on changes over time in the phase of the beat signal, the signal processing unit 15 detects a rotation direction of the phase of the beat signal on an IQ plane. In addition, at step S10, the signal processing unit 15 uses either of the positive frequency components and the negative frequency components on the frequency spectrum of the beat signal, based on the detected rotation direction. As a result, at step S10, the power spectrum is generated such that the frequencies of the beat signal are positive when the observation point moves near the own vehicle and the frequencies of the beat signal are negative when the observation point moves away from the own vehicle.

For each of a plurality of frequency bins FB(0), FB(1), FB(2), . . . FB(m) (m being a positive integer) to which differing frequencies are set, the power spectrum indicates the strength of the corresponding frequency. The frequency bins FB(0), FB(1), FB(2), . . . FB(m) are provided in order from the lowest frequency.

Here, a power spectrum when the object that has reflected the radar waves is a stationary object, and a power spectrum when the object that has reflected the radar waves is a traveling vehicle will be described.

Figure 4:
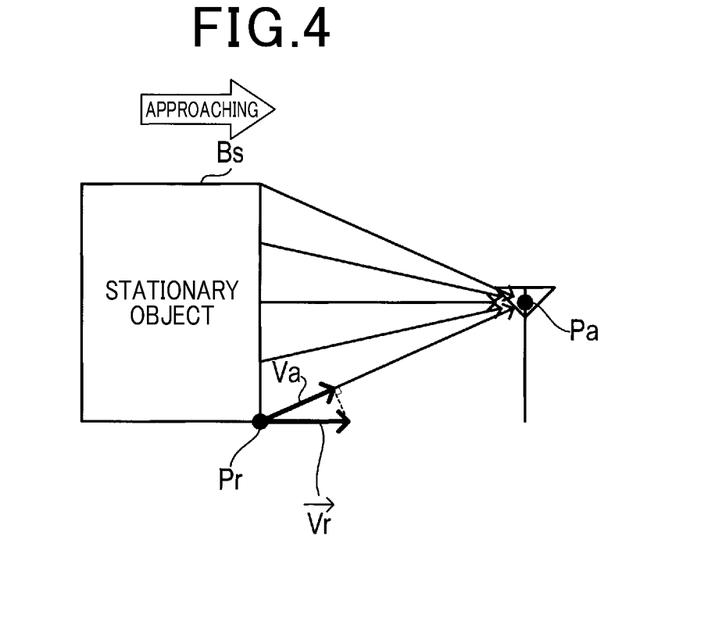
FIG. 4 is a diagram for explaining a state in which radar waves reflected by an approaching stationary object are received.

First, as shown in FIG. 4, when the radar waves are reflected by a stationary object Bs that is approaching the radar apparatus 4 of the own vehicle that is traveling, the radar apparatus 4 detects a speed of approach towards the radar apparatus 4. That is, in terms of a relative speed vector (see relative speed vector Vr in FIG. 4) indicating the magnitude and direction of the relative speed of the stationary object Bs approaching the radar apparatus 4, the relative speed detected by the radar apparatus 4 is a speed component Va in a direction towards a center Pa of the antenna of the radar apparatus 4 from a reflection point Pr at which the stationary object Bs reflects the radar wave.

Therefore, when the height of the reflection point Pr on the stationary object Bs is the same as the height of the center Pa of the antenna, the speed component Va is at maximum. The speed component Va decreases as the difference between the height of the reflection point Pr and the height of the center Pa of the antenna increases.

Figure 5:
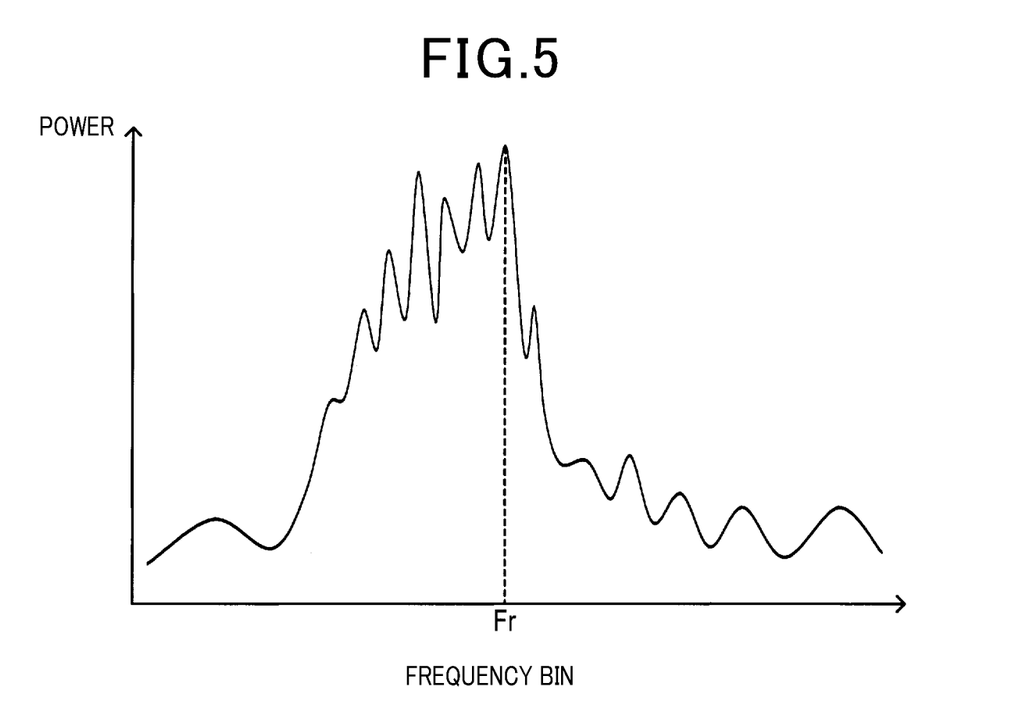
FIG. 5 is a diagram of a power spectrum when an approaching stationary object is detected.

Therefore, for example, as shown in FIG. 5, in the power spectrum when the stationary object Bs is detected, power increases when, in the vicinity of a beat signal frequency Fr (referred to, hereafter, as a relative speed frequency Fr) corresponding to the relative speed (that is, the magnitude of the relative speed vector Vr) between the own vehicle that is traveling and the stationary object Bs, the beat signal frequency becomes less than the relative speed frequency Fr. A frequency range over which power increases near the relative speed frequency Fr widens as the stationary object Bs becomes higher. Meanwhile, in the power spectrum when the stationary object Bs is detected, power suddenly decreases when the beat signal frequency becomes higher than the beat signal freso as toquency Fr.

Next, when the radar waves are reflected by a traveling vehicle that is approaching the radar apparatus 4 of the own vehicle that is traveling, the radar apparatus 4 detects the speed of a wheel on the traveling vehicle.

Figure 6:
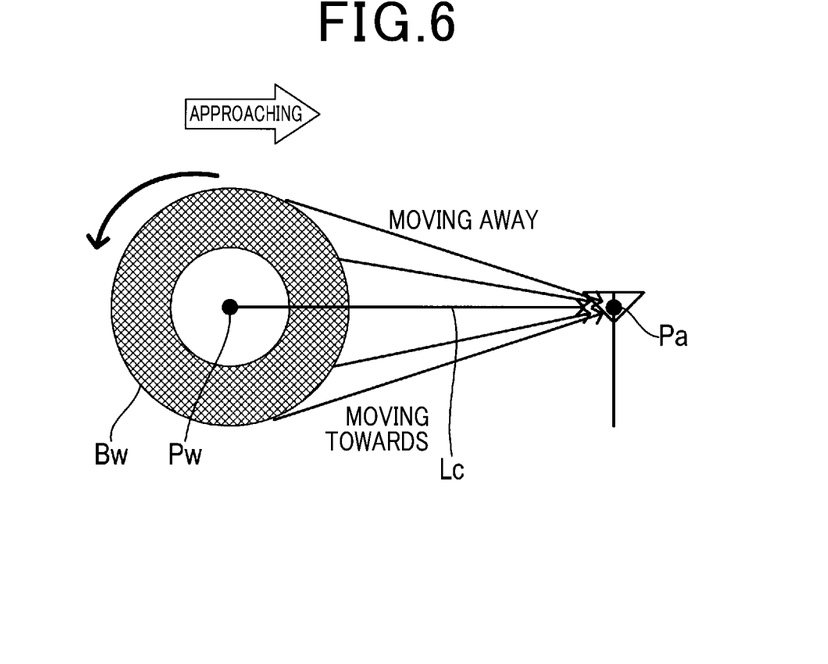
FIG. 6 is a diagram for explaining a state in which radar waves reflected by an approaching traveling vehicle are received.

For example, when the advancing direction of the traveling vehicle approaching from ahead of the own vehicle is the same as the advancing direction of the own vehicle, as shown in FIG. 6, the speed in a direction away from the radar apparatus 4 is detected at a reflection point on a wheel Bw of the traveling vehicle above a line Lc connecting a rotation shaft Pw of the wheel Bw and the center Pa of the antenna. In addition, the speed in a direction approaching the radar apparatus 4 is detected at a reflection point below the line Lc connecting the rotation shaft Pw of the wheel Bw and the center Pa of the antenna.

Meanwhile, when the advancing direction of the traveling vehicle approaching from ahead of the own vehicle is opposite the advancing direction of the own vehicle, the speed in the direction approaching the radar apparatus 4 is detected at the reflection point on the wheel Bw of the traveling vehicle above the above-described line Lc. The speed in the direction away from the radar apparatus 4 is detected at the reflection point below the line Lc (not shown).

In addition, the magnitude of the speed detected by the radar apparatus 4 increases as the difference between the height of the rotation shaft Pw of the wheel Bw and the height of the reflection point on the wheel Bw increases.

In addition, the strength of the reflected radar wave detected by the radar apparatus 4 decreases as the difference between the height of the rotation shaft Pw of the wheel Bw and the height of the reflection point on the wheel Bw increases. A reason for this is that the distance between the center Pa of the antenna and the reflection point on the wheel Bw increases as the difference between the height of the rotation shaft Pw of the wheel Bw and the height of the reflection point on the wheel Bw increases.

Furthermore, the wheel Bw is formed so as to be horizontally symmetrical with the rotation shaft Pw at the center. Therefore, attenuation in the strength of the reflected radar waves is also horizontally symmetrical.

Figure 7:
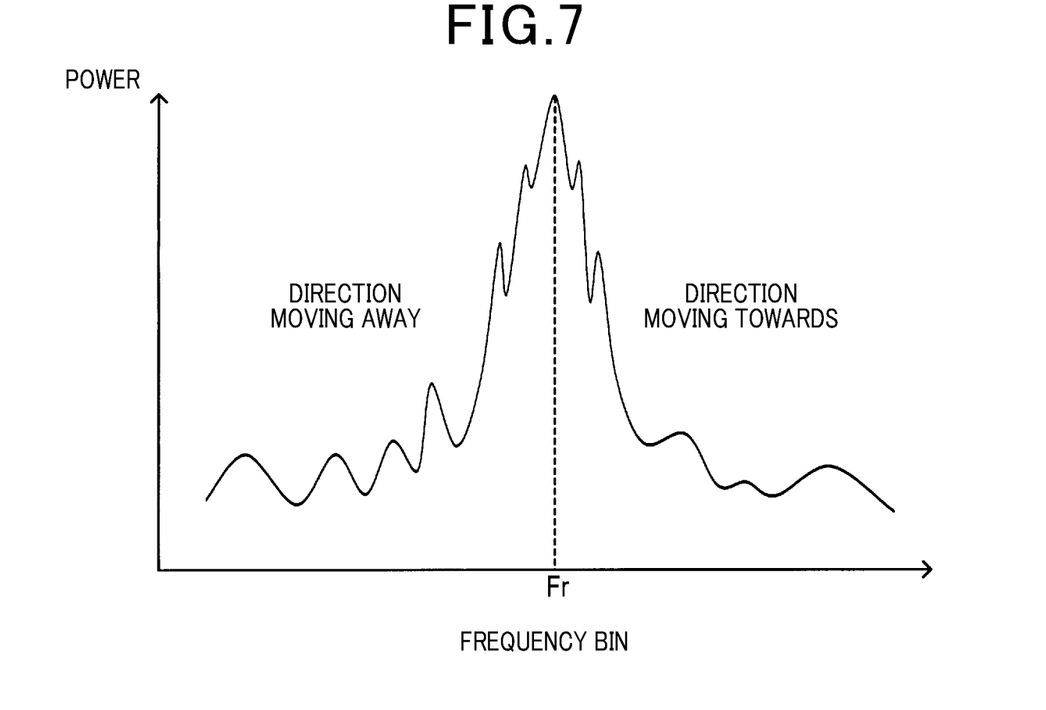
FIG. 7 is a diagram of a power spectrum when an approaching traveling vehicle is detected.

Therefore, for example, as shown in FIG. 7, in the power spectrum when the wheel of a traveling vehicle is detected, power becomes maximum at the beat signal frequency Fr (relative speed frequency Fr) corresponding to the relative speed between the own vehicle that is traveling and the wheel of the traveling vehicle. Power then decreases as the difference with the beat signal frequency Fr increases. Furthermore, a vertically symmetrical power distribution with the relative speed frequency Fr at the center is formed.

Then, as shown in FIG. 3, upon completing the process at step S10, at step S20, the signal processing unit 15 sets a bin designation value N to zero. The bin designation value N is used to designate a frequency bin. For example, when the bin designation value N is set to 10, the bin designation value N designates the frequency bin FB(10).

Figure 8:
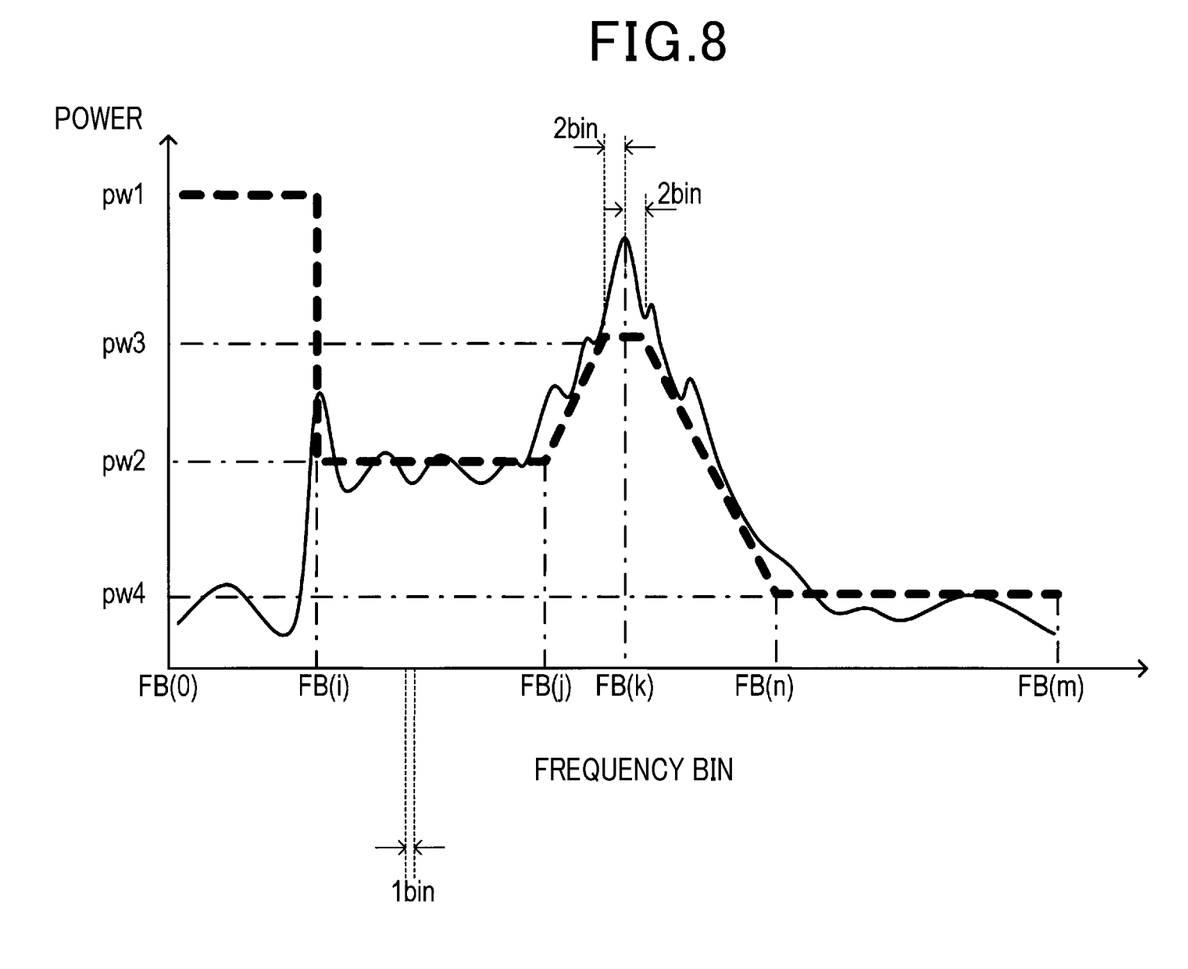
FIG. 8 is a diagram for explaining a power threshold setting method.

Furthermore, at step S30, the signal processing unit 15 sets a threshold-exceeded count Ct to zero. Subsequently, at step S40, the signal processing unit 15 acquires own vehicle speed information indicating the traveling speed of the own vehicle from the vehicle speed sensor 3. Then, as shown in FIG. 8, the signal processing unit 15 sets power threshold TJ(0) to power threshold TJ(m) based on the own vehicle speed information and the power spectrum generated at step S10.

First, the power thresholds TJ(0) to TJ(i−1) are set to a first determination power pw1. The first determination power pw1 is set to a value sufficiently large enough such that a relationship in which power PW(N)>power threshold TJ(N) is not established. In addition, the frequency bin FB(i) corresponds to a relative speed moving away at the same speed as the traveling speed of the own vehicle. In other words, the frequency bin FB(i) corresponds to the relative speed of a stationary object.

The power thresholds TJ(i) to TJ(j−1) are set to a second determination power pw2 that is less than the first determination power pw1 (j>i). The second determination power pw2 is set such that the relationship in which power PW(N)>power threshold TJ(N) is not established, based on the power values of the frequency bins FB(i) to FB(j−1).

The power threshold TJ(j) is set to the second determination power pw2 and TJ(k−2) is set to a third determination power pw3 (k−2>j). The third determination power pw3 is set such that the relationship in which power PW(N)>power threshold TJ(N) is established when an object of which the relative speed is zero is present in the vicinity of the own vehicle, and the relationship in which power PW(N)>power threshold TJ(N) is not established when an object of which the relative speed is zero is not present in the vicinity of the own vehicle.

The power thresholds TJ(j+1) to TJ(k−3) are set such as to monotonically increase between the second determination power pw2 and the third determination power pw3 at predetermined slope percentage, in accompaniment with the increase in the bin designation value N.

The power thresholds TJ(k−1) to TJ(k+1) are set to the third determination power pw3.

TJ(k+2) is set to the third determination power pw3 and TJ(n) is set to a fourth determination power pw4 (n>k+2). The fourth determination power pw4 is set such that the relationship in which power PW(N)>power threshold TJ(N) is not established, based on the power values of the frequency bins having frequencies sufficiently greater than the frequency corresponding to the frequency bin FB(k).

The power thresholds TJ(k+3) to TJ(n−1) are set so as to monotonically decrease between the third determination power pw3 and the fourth determination power pw4 at the above-described slope, in accompaniment with the increase in the bin designation value N.

The power thresholds TJ(n+1) to TJ(m) are set to the fourth determination power pw4. For example, the fourth determination power pw4 is calculated by a following expression (3).

[Formula 1]

$$pw4 = \frac{1}{s} \sum_{i=m-s}^{m} PW(i) + \alpha \quad (3)$$

Expression (3) indicates that an average value of the power PW for s bins from the frequency bins FB(m−s) to FB(m) is determined, and a value obtained by an offset α of a fixed amount being added to the average value is set as the fourth determination power pw4. Here, (m−s) is a value greater than n. That is, FB(m−s)>frequency bin FB(n).

Subsequently, at step S50, whether or not power PW(N) corresponding to the frequency bin (referred to, hereafter, as a frequency bin FB(N)) designated by the bin designation value N is greater than the predetermined power threshold TJ(N) for the frequency bin FB(N) is determined.

Here, when determined that the power PW(N) is the power threshold TJ(N) or less (NO at step S50), the signal processing unit 15 proceeds to step S70. Meanwhile, when determined that the power PW(N) is greater than the power threshold TJ(N) (YES at step S50), at step S60, the signal processing unit 15 increments (adds 1 to) the threshold-exceeded count Ct, and proceeds to step S70.

Then, upon proceeding to step S70, the signal processing unit 15 increments the bin designation value N. At step S80, the signal processing unit 15 determines whether or not the bin designation value N is equal to or less than a predetermined determination end value m. Here, when determined that the bin designation value N is the determination end value m or less (NO at step S80), the signal processing unit 15 proceeds to step S50 and repeats the above-described processes. Meanwhile, when determined that the bin designation value N is greater than the determination end value m (YES at step S80), at step S90, the signal processing unit 15 determines whether or not the threshold-exceeded count Ct is greater than a predetermined detection determination value.

Here, when determined that the threshold-exceeded count Ct is the detection determination value or less (NO at step S90), at step S100, the signal processing unit 15 clears a detection flag Fd and proceeds to step S120. Meanwhile, when determined that the threshold-exceeded count Ct is greater than the detection determination value (YES at step S90), at step S110, the signal processing unit 15 sets the detection flag Fd and proceeds to step S120.

Then, upon proceeding to step S120, whether or not the detection flag Fd is set is determined. Here, when determined that the detection flag Fd is set (YES at step S120), at step S130, the signal processing unit 15 determines whether or not the warning apparatus 2 is performing a notification (referred to, hereafter, as an other vehicle present notification) indicating that a traveling vehicle is present near the own vehicle.

Here, when determined that the warning apparatus 2 is performing the other vehicle present notification (YES at step S120), the signal processing unit 15 temporarily ends the traveling vehicle detection process. Meanwhile, when determined that the warning apparatus 2 is not performing the other vehicle present notification (NO at step S120), at step S130, the signal processing unit 15 makes the warning apparatus 2 start the other vehicle present notification and temporarily ends the traveling vehicle detection process.

In addition, when determined at step S120 that the detection flag Fd is not set (NO at step S120), at step S150, the signal processing unit 15 determines whether or not the warning apparatus 2 is performing the other vehicle present notification. Here, when determined that the warning apparatus 2 is not performing the other vehicle present notification (NO at step S150), the signal processing unit 15 temporarily ends the traveling vehicle detection process. Meanwhile, when determined that the warning apparatus 2 is performing the other vehicle present notification (YES at step S150), at step S160, the signal processing unit 15 makes the warning apparatus 2 end the other vehicle present notification and temporarily ends the traveling vehicle detection process.

The radar apparatus 4 of the vehicle warning system 1 configured in this way is attached to the vehicle such that the direction at 90° relative to the front-rear direction of the vehicle is included in the detection range. The radar apparatus 4 transmits and receives radar waves and thereby detects a relative speed in relation to an observation point that is present within the detection range and has reflected the radar waves and.

In addition, the radar apparatus 4 generates a power spectrum indicating a correspondence relationship between the frequency of the beat signal and the strength of the beat signal for a plurality of observation points (step S10).

Furthermore, the radar apparatus 4 determines that a traveling vehicle is detected when, in the power spectrum, all of a first detection condition, a second detection condition, and a third detection condition are met (steps S20 to S100). The first detection condition is that the strength of the beat signal decreases as the frequency of the beat signal increases from the relative speed frequency Fr. The second detection condition is that the strength of the beat signal decreases as the frequency of the beat signal decreases from the relative speed frequency Fr. The third detection condition is that the distribution of the strength of the beat signal is symmetrical with the relative speed frequency Fr at the center.

In the radar apparatus 4 configured in this way, a wheel that is rotating is detected based on the first detection condition, the second detection condition, and the third detection condition. In addition, the radar apparatus 4 determines that a traveling vehicle is detected as a result of determining that the object including the wheel that is rotating is a vehicle that is traveling.

In this way, as a result of the radar apparatus 4, a wheel that is rotating can be detected based on the above-described power spectrum. Therefore, whether or not a detected object is traveling can be determined even when the relative speed in relation to the detected object is zero.

In addition, the radar apparatus 4 detects the observation point relative speed by transmitting and receiving radar waves based on the dual-frequency CW method. Furthermore, the radar apparatus 4 detects a traveling vehicle by generating a power spectrum indicating the correspondence relationship between the frequency of the beat signal and the strength of the beat signal. A reason for this is because, in the dual-frequency CW method, a proportional relationship is established between the frequency of the generated beat signal and the observation point relative speed, and a proportional relationship is established between the strength of the generated beat signal and the reflection strength of the radar waves reflected at the observation point.

In this way, to detect a traveling vehicle, the radar apparatus 4 can use the power spectrum that is typically generated in the dual-frequency CW method. Therefore, calculation processing load for detecting a traveling vehicle can be reduced.

In addition, the radar apparatus 4 determines whether or not a traveling vehicle is detected by comparing the strength of the beat signal to the power thresholds TJ(j+1) to TJ(k−3) and TJ(k+3) to TJ(n−1) that are predetermined so as to monotonically decrease at a predetermined slope percentage as the frequency of the beat signal increases from the relative speed frequency Fr (frequency bin FB(k)) and so as to monotonically decrease at the above-described slope percentage as the frequency of the beat signal decreases from the relative speed frequency Fr.

As a result, the traveling vehicle can be detected by a simple method in which the power threshold TJ and the strength of the beat signal are compared. Calculation processing load for detecting a traveling vehicle can be reduced.

In addition, in the vehicle warning system 1, when the radar apparatus 4 that has detected a traveling vehicle makes a determination, the warning apparatus 2 performs an other vehicle present notification for the occupant of the vehicle. As a result, when a traveling vehicle is present near the own vehicle, the occupant of the vehicle can be notified of the presence.

According to the above-described embodiment, the radar apparatus 4 is an on-board radar apparatus of the present invention. The process at step S10 by the signal processing unit 15 is a strength distribution generating means of the present invention. The processes at steps S20 to S100 by the signal processing unit 15 are a traveling vehicle detecting means of the present invention. The warning apparatus 2 is a notification apparatus of the present invention. The vehicle warning system 1 is a notification system of the present invention.

An embodiment of the present invention is described above. However, the present invention is not limited to the above-described embodiment. Various embodiments are possible as long the embodiments belong within the technical scope of the present invention.

For example, according to the above-described embodiment, that in which the relative speed in relation to an observation point is detected through use of the dual-frequency CW method is described. However, the detection method is not limited thereto. For example, the relative speed may be detected through use of a frequency-modulated continuous-wave (FMCW) method.

In addition, according to the above-described embodiment, that in which the reception antenna 13 is attached so as to face behind the own vehicle is described. However, the present invention is also applicable to when the reception antenna 13 is attached so as to face ahead of the own vehicle.

In addition, according to the above-described embodiment, that in which the relative speed frequency Fr is not particularly limited is described. However, the relative speed frequency Fr may be fixed to a value corresponding to an observation point relative speed of 0 km/h (that is, relative speed frequency Fr=0). As a result, whether or not a detected object is traveling can be determined even under circumstances in which whether or not the detected object is traveling cannot be determined based on the observation point relative speed as a result of the observation point relative speed being zero.

In addition, according to the above-described embodiment, that in which the above-described slope percentage is fixed is described. However, a plurality of differing slope percentages may be predetermined based on vehicle size (such as truck, standard-sized car, minicar, and motorcycle), and the slope percentage closest to the slope of the peaks near the relative speed frequency Fr in the generated power spectrum may be selected.

In addition, according to the above-described embodiment, that in which the determination powers pw1 to pw4 are calculated based on the generated power spectrum every time a power spectrum is generated at step S10 is described. However, because the shape of the power spectrum does not significantly change over a short amount of time, the determination powers pw1 to pw4 may be calculated at every plurality of times the power spectrum is generated.

Furthermore, according to the above-described embodiment, that in which the power threshold TJ and the strength of the beat signal are compared over the overall frequency range of the power spectrum is described. However, the power threshold TJ and the strength of the beat signal may be compared over a predetermined frequency range that is near the relative speed frequency Fr.

In addition, a function provided by a single constituent element according to the above-described embodiment may be dispersed among a plurality of constituent elements. Functions provided by a plurality of constituent elements may be integrated in a single constituent element. Furthermore, at least a part of a configuration according to the above-described embodiment may be replaced by a publicly known configuration having a similar function. In addition, a part of a configuration according to the above-described embodiment may be omitted. Furthermore, at least a part of a configuration according to an above-described embodiment may be added to or replace a configuration according to another above-described embodiment. All aspects included in the technical concept identified solely by the expressions recited in the claims are embodiments of the present invention.

REFERENCE SIGNS LIST

1: vehicle warning system
2: warning apparatus
4: radar apparatus

The invention claimed is:

1. An on-board radar apparatus that is attached to a vehicle such that a direction at 90 degrees in relation to a front-rear direction of the vehicle is included in a detection range, and transmits and receives radar waves, thereby detecting an observation point relative speed that is a relative speed in relation to an observation point that is present within the detection range and has reflected the radar waves, the on-board radar apparatus comprising:
 a processor, wherein the processor is configured to:
 generate a strength distribution indicating a correspondence relationship between a relative speed parameter related to the observation point relative speed and a reflection strength parameter related to reflection strength of the radar waves reflected at the observation point, for a plurality of observation points; and
 determine that a traveling vehicle is detected in response to, in the strength distribution:
  the reflection strength parameter decreasing as the relative speed parameter increases from a center relative speed parameter that is the relative speed parameter corresponding to a peak in the reflection strength;
  the reflection strength parameter decreasing as the relative speed parameter decreases from the center relative speed parameter; and
  a distribution of the reflection strength parameter being substantially symmetrical with the center relative speed parameter at a center of the distribution, wherein
 the processor determines whether or not the traveling vehicle is detected by comparing the reflection strength parameter to a traveling vehicle determination value that is predetermined so as to monotonically decrease at a predetermined slope percentage as the relative speed parameter increases from the center relative speed parameter and so as to monotonically decrease at the slope percentage as the relative speed parameter decreases from the center relative speed parameter.

2. The on-board radar apparatus according to claim 1, wherein:
 the on-board radar apparatus detects the observation point relative speed by transmitting and receiving the radar waves by a dual-frequency continuous-wave method;
 the relative speed parameter is frequency of a beat signal generated based on the dual-frequency continuous wave method in the on-board radar apparatus; and
 the reflection strength parameter is strength of the beat signal.

3. The on-board radar apparatus according to claim 2, wherein:
 the center relative speed parameter is a value corresponding to the observation point relative speed of 0 km/h.

4. The on-board radar apparatus according to claim 1, wherein:
 the center relative speed parameter is a value corresponding to the observation point relative speed of 0 km/h.

5. A notification system comprising:
 an on-board radar apparatus that is attached to a vehicle such that a direction at 90 degrees in relation to a front-rear direction of the vehicle is included in a detection range, and transmits and receives radar waves, thereby detecting an observation point relative speed that is a relative speed in relation to an observation point that is present within the detection range and has reflected the radar waves, the on-board radar apparatus comprising:
  a processor, wherein the processor is configured to:
  generate a strength distribution indicating a correspondence relationship between a relative speed parameter related to the observation point relative speed and a reflection strength parameter related to reflection strength of the radar waves reflected at the observation point, for a plurality of observation points; and
  determine that a traveling vehicle is detected in response to, in the strength distribution:
   the reflection strength parameter decreasing as the relative speed parameter increases from a center relative speed parameter that is the relative speed parameter corresponding to a peak in the reflection strength;
   the reflection strength parameter decreasing as the relative speed parameter decreases from the center relative speed parameter; and
   a distribution of the reflection strength parameter being substantially symmetrical with the center relative speed parameter at a center of the distribution; and
 a notification apparatus that, in response to the processor determines that the traveling vehicle being detected, notifies an occupant of the vehicle of the determination, wherein
 the processor determines whether or not the traveling vehicle is detected by comparing the reflection strength parameter to a traveling vehicle determination value that is predetermined so as to monotonically decrease at a predetermined slope percentage as the relative speed parameter increases from the center relative speed parameter and so as to monotonically decrease at the slope percentage as the relative speed parameter decreases from the center relative speed parameter.

6. The notification system according to claim 5 wherein:
 the on-board radar apparatus detects the observation point relative speed by transmitting and receiving the radar waves by a dual-frequency continuous-wave method;
 the relative speed parameter is frequency of a beat signal generated based on the dual-frequency continuous wave method in the on-board radar apparatus; and
 the reflection strength parameter is strength of the beat signal.

7. The notification system according to claim 5 wherein:
 the center relative speed parameter is a value corresponding to the observation point relative speed of 0 km/h.

8. A traveling vehicle detection method of an on-board radar apparatus that is attached to a vehicle such that a direction at 90 degrees in relation to a front-rear direction of the vehicle is included in a detection range, and transmits and receives radar waves, thereby detecting an observation point relative speed that is a relative speed in relation to an observation point that is present within the detection range and has reflected the radar waves, the traveling vehicle detection method comprising:
 generating, by the on-board radar apparatus, a strength distribution indicating a correspondence relationship between a relative speed parameter related to the observation point relative speed and a reflection strength parameter related to reflection strength of the radar waves reflected at the observation point, for a plurality of observation points; and determining, by the on-board radar apparatus, that a traveling vehicle is detected in response to, in the strength distribution:

the reflection strength parameter decreasing as the relative speed parameter increases from a center relative speed parameter that is the relative speed parameter corresponding to a peak in the reflection strength;

the reflection strength parameter decreasing as the relative speed parameter decreases from the center relative speed parameter; and a distribution of the reflection strength parameter being substantially symmetrical with the center relative speed parameter at a center of the distribution, wherein determining that a traveling vehicle is detected comprises determining whether or not the traveling vehicle is detected by comparing the reflection strength parameter to a traveling vehicle determination value that is predetermined so as to monotonically decrease at a predetermined slope percentage as the relative speed parameter increases from the center relative speed parameter and so as to monotonically decrease at the slope percentage as the relative speed parameter decreases from the center relative speed parameter.

* * * * *